(12) United States Patent
Farrow et al.

(10) Patent No.: US 11,005,528 B2
(45) Date of Patent: May 11, 2021

(54) CONTROLLING COMMUNICATIONS IN RESPECT OF LOCAL AREA NETWORKS

(71) Applicant: BRITISH TELECOMMUNICATIONS PUBLIC LIMITED COMPANY, London (GB)

(72) Inventors: Nicholas Farrow, London (GB); Adrian Thurlow, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/651,692

(22) PCT Filed: Sep. 25, 2018

(86) PCT No.: PCT/EP2018/075947
§ 371 (c)(1),
(2) Date: Mar. 27, 2020

(87) PCT Pub. No.: WO2019/063537
PCT Pub. Date: Apr. 4, 2019

(65) Prior Publication Data
US 2020/0235781 A1    Jul. 23, 2020

(30) Foreign Application Priority Data
Sep. 28, 2017  (EP) ..................................... 17193783

(51) Int. Cl.
*H04B 3/46* (2015.01)
*H04B 3/32* (2006.01)
(Continued)

(52) U.S. Cl.
CPC ................ *H04B 3/46* (2013.01); *H04B 3/32* (2013.01); *H04B 3/54* (2013.01); *H04L 12/28* (2013.01); *H04L 12/66* (2013.01)

(58) Field of Classification Search
None
See application file for complete search history.

(56) References Cited

U.S. PATENT DOCUMENTS 3,559,665 A * 2/1971 Davis ...................... F01D 17/02
137/39
4,642,806 A * 2/1987 Hewitt ...................... H04B 7/24
370/347
(Continued)

FOREIGN PATENT DOCUMENTS

EP    2 775 696        9/2014
EP    2775696  A1 *    9/2014 .............. H04M 3/34
(Continued)

OTHER PUBLICATIONS

U.S. Appl. No. 16/754,196, filed Apr. 7, 2020, Identifying Interfering Links in Local Area Networks.
(Continued)

*Primary Examiner* — Berhanu Tadese
(74) *Attorney, Agent, or Firm* — Nixon & Vanderhye P.C.

(57) ABSTRACT

Methods, apparatus and devices are disclosed for controlling communications in respect of local area networks (20) having user-devices (22, 23, 24, 25) located therein operable to communicate via a local area network (LAN) gateway device (30) with remote devices in a communications network (10,15) outside the LAN (20), communications being carried via one or more LAN links (28) for at least a portion of a path between user-devices (22, 23, 24, 25) and the gateway device (30), and being carried via a digital subscriber (xDSL) line (19) for at least a portion of a path between the gateway device (30) and the remote devices. The method comprises monitoring digital subscriber line performance characteristics in respect of data communications on the xDSL line (19) whereby to identify changes therein; monitoring data flow rate in respect of data flows on
(Continued)

Impact Analyser (IA) Flowchart

LAN links (28) whereby to identify changes therein; and adjusting the data flow rate in respect of the data flows in the event that identified changes in digital subscriber line performance characteristics coincide with identified changes in data flow rate.

20 Claims, 5 Drawing Sheets

(51) Int. Cl.
*H04B 3/54* (2006.01)
*H04L 12/28* (2006.01)
*H04L 12/66* (2006.01)

(56) References Cited

U.S. PATENT DOCUMENTS

| | | | | |
|---|---|---|---|---|
| 5,004,314 A * | 4/1991 | Booth | ............... | G02F 1/225 359/245 |
| 5,757,912 A * | 5/1998 | Blow | ............... | H04L 9/0858 380/256 |
| 5,953,421 A * | 9/1999 | Townsend | ............... | H04L 9/0858 380/256 |
| 6,529,877 B1 * | 3/2003 | Murphy | ............... | G06Q 10/04 705/7.22 |
| 6,738,819 B1 * | 5/2004 | Li | ............... | H04L 45/302 370/230 |
| 7,447,791 B2 * | 11/2008 | Leaning | ............... | H04L 29/06 375/E7.013 |
| 7,643,417 B2 * | 1/2010 | Van Nieuwenhuizen | ............... | H04L 12/1489 370/232 |
| 7,974,200 B2 * | 7/2011 | Walker | ............... | H04N 21/64322 370/235 |
| 8,271,852 B2 * | 9/2012 | Kirkby | ............... | H04L 1/0009 714/762 |
| 8,442,149 B2 * | 5/2013 | Humphrey | ............... | H04L 1/206 375/296 |
| 9,479,223 B2 * | 10/2016 | Wallace | ............... | H04M 11/062 |
| 9,497,065 B2 * | 11/2016 | Rizzo | ............... | H04L 67/1074 |
| 9,525,460 B1 * | 12/2016 | Vazquez | ............... | H04B 3/48 |
| 2003/0218549 A1 * | 11/2003 | Logvinov | ............... | H04B 3/542 340/870.07 |
| 2005/0233464 A1 * | 10/2005 | Compton | ............... | G01N 30/72 436/161 |
| 2008/0247537 A1 * | 10/2008 | Henry | ............... | H04B 3/32 379/416 |
| 2011/0053528 A1 * | 3/2011 | Cunningham | ............... | H04B 3/46 455/114.2 |
| 2012/0106606 A1 | 5/2012 | Samy | | |
| 2013/0339529 A1 * | 12/2013 | Rizzo | ............... | H04L 67/322 709/226 |
| 2014/0086290 A1 * | 3/2014 | Samy | ............... | H04L 5/0062 375/222 |
| 2014/0269860 A1 * | 9/2014 | Brown | ............... | H04B 3/54 375/219 |
| 2015/0134809 A1 * | 5/2015 | Tofighbakhsh | ............... | H04L 63/083 709/224 |
| 2015/0381236 A1 * | 12/2015 | Wallace | ............... | H04M 11/062 379/1.03 |
| 2016/0365897 A1 | 12/2016 | Gross et al. | | |
| 2017/0006504 A1 * | 1/2017 | Townend | ............... | H04W 28/0257 |
| 2017/0111807 A1 * | 4/2017 | Townend | ............... | H04L 43/0888 |
| 2017/0155547 A1 * | 6/2017 | Lockyer | ............... | H04L 41/0677 |
| 2017/0244446 A1 * | 8/2017 | Al Rawi | ............... | H04B 3/32 |
| 2017/0288996 A1 * | 10/2017 | Farrow | ............... | H04L 43/087 |
| 2017/0295044 A1 * | 10/2017 | Oksman | ............... | H04B 3/32 |
| 2018/0343068 A1 * | 11/2018 | Afkhami | ............... | H04B 3/542 |
| 2019/0281166 A1 * | 9/2019 | Horsley | ............... | H04B 3/54 |
| 2019/0288744 A1 * | 9/2019 | Horsley | ............... | H04M 11/062 |
| 2020/0221518 A1 * | 7/2020 | Schmitz | ............... | H04L 41/147 |
| 2020/0235781 A1 * | 7/2020 | Farrow | ............... | H04B 3/32 |

FOREIGN PATENT DOCUMENTS

| | | | | |
|---|---|---|---|---|
| EP | 2 793 403 | | 10/2014 | |
| EP | 2793403 A1 * | | 10/2014 | ............... H04B 3/32 |
| EP | 2793403 B1 * | | 2/2017 | ............... H04J 3/14 |
| GB | 2566964 A * | | 4/2019 | ............... H04B 3/32 |
| WO | WO-2007081171 A1 * | | 7/2007 | ......... H04L 12/2803 |
| WO | 2014/051630 | | 4/2014 | |
| WO | 2015/144538 | | 10/2015 | |
| WO | 2019/072546 | | 4/2019 | |
| WO | WO-2019063537 A1 * | | 4/2019 | ............. H04L 12/28 |
| WO | WO-2019072546 A1 * | | 4/2019 | ............. H04B 3/487 |

OTHER PUBLICATIONS

U.S. Appl. No. 16/754,196 to Farrow, et al., filed Apr. 7, 2020 entitled "Identifying Interfering Links in Local Area Networks" (41 pages).
Ravi Mantri Metanoia Technologies Inc., AT&T, Inc.: "G.hn, G.vdsl, G.fast Powerline Interference Indication and Mitigation for DSL Transceivers"; COM 15-C 0175,Jul. 2013, ITU-T Draft ; Study Period 2013-2016, International Telecommunication Union, Geneva , CH, vol. 18/15,4/15, Oct. 29, 2013 (Oct. 29, 2013) 16 pages.
ITU-T Telecommunication Standardization Sector of ITU, Series G.9977 (Feb. 2016): Series G: "Transmission Systems and Media, Digital Systems and Networks, Access Networks—In Premises Networks, Mitigation of Interference between DSL and PLC" 48 pages.
ITU-T Telecommunication Standardization Sector of ITU, Series G.9961 (Jul. 2015): Series G: "Transmission Systems and Media, Digital Systems and Networks, Access Networks—In Premises Networks, Unified High-Speed Wireline-Based Home Networking Transceivers—Data Link Layer Specification" 390 pages.
Extended European Search Report for EP Application No. 17193783.2 dated Feb. 23, 2018, 9 pages.
Search Report and Written Opinion for PCT/EP2018/075947 dated Oct. 23, 2018, 11 pages.
GB Search Report for GB 1715720.7, dated Mar. 13, 2018, 5 pages.
Extended European Search Report for EP Application No. 17195703.8 dated Feb. 2, 2018, 9 pages.
GB Search Report for GB 1716570.5, dated Mar. 13, 2018, 6 pages.
Search Report and Written Opinion for PCT/EP2018/075950 dated Oct. 31, 2018, 12 pages.

* cited by examiner

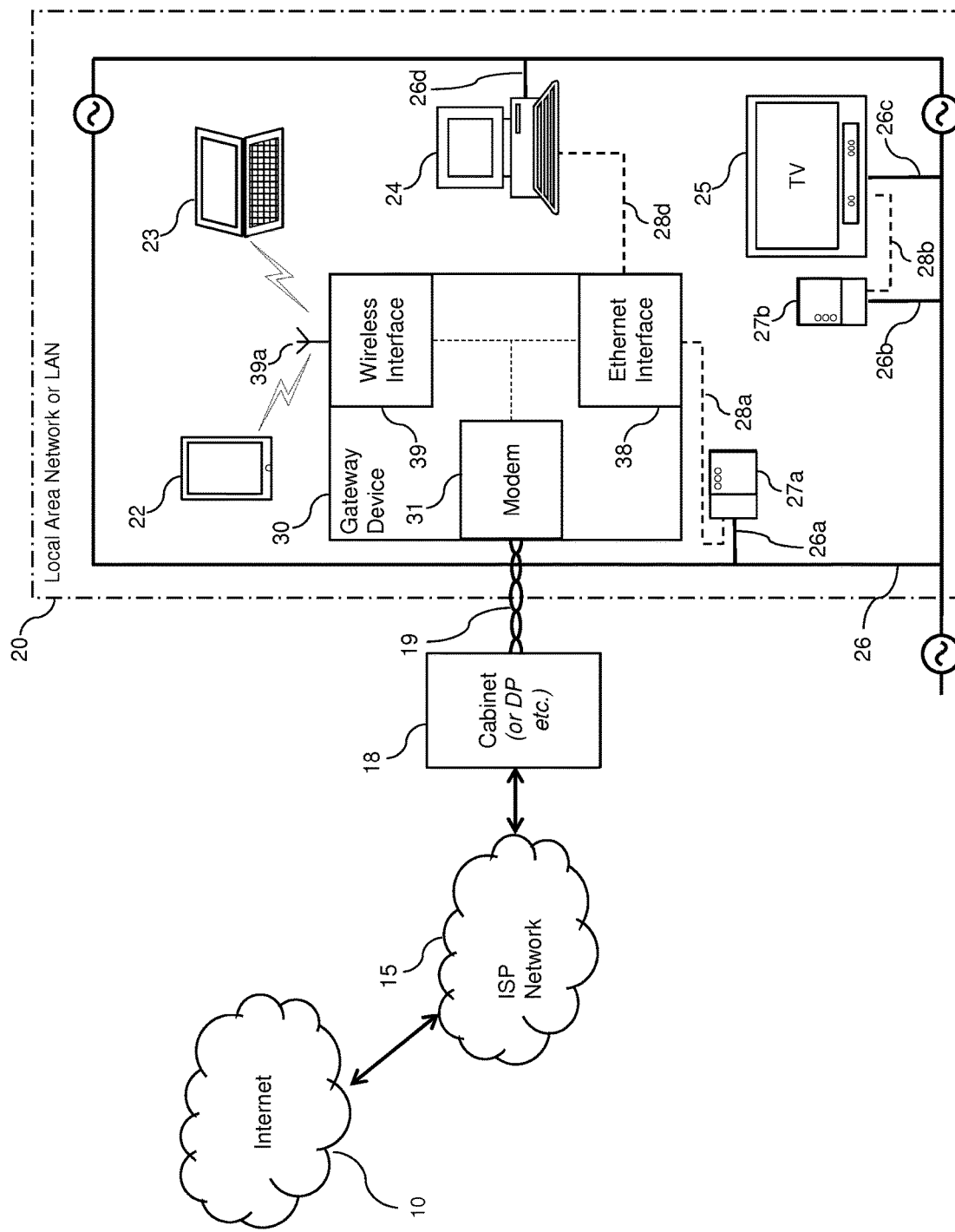
Figure 1: Connectivity of User-Devices within a Local Area Network

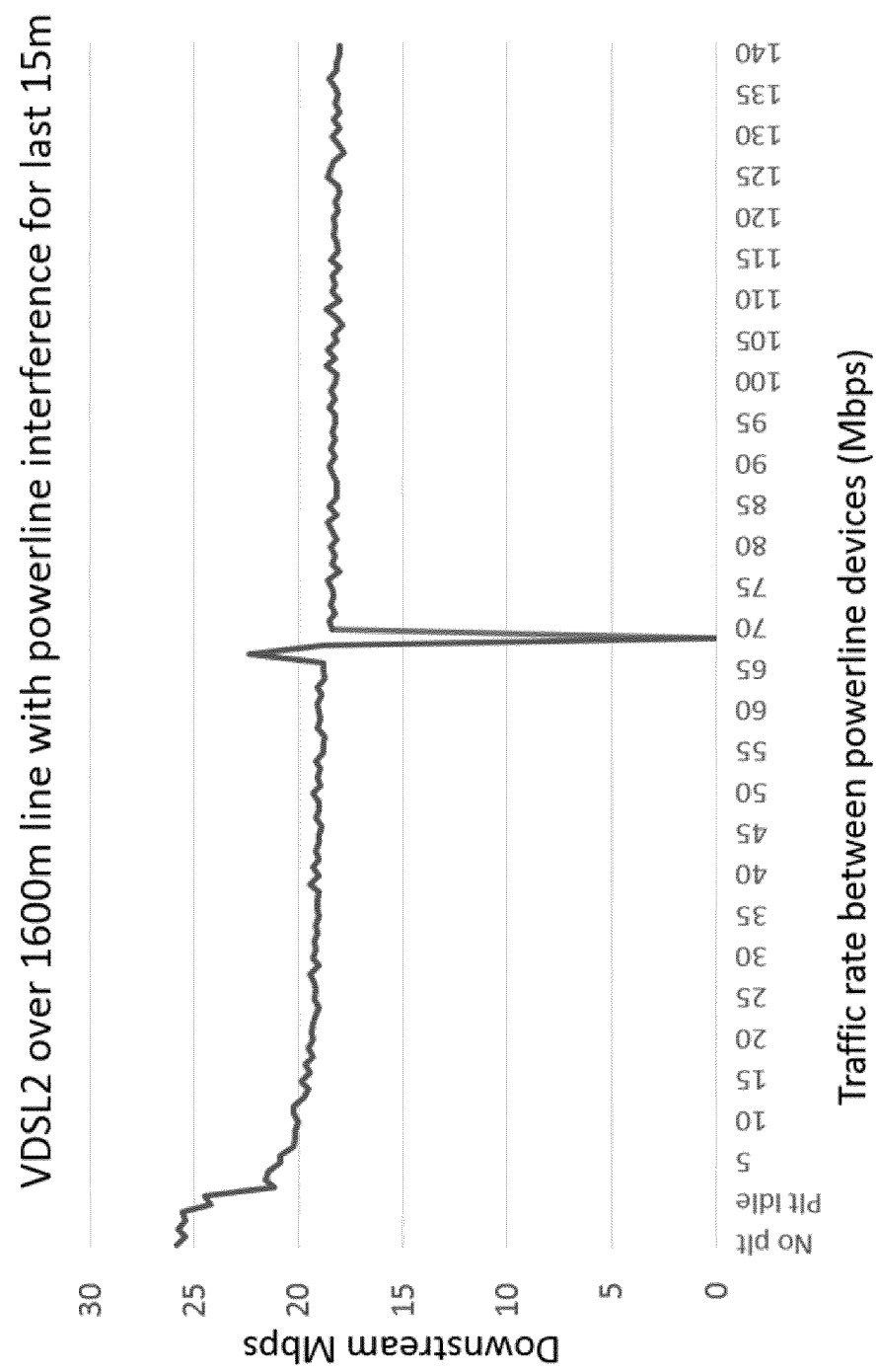
Figure 2: VDSL Degradation Related to Powerline Traffic Rate

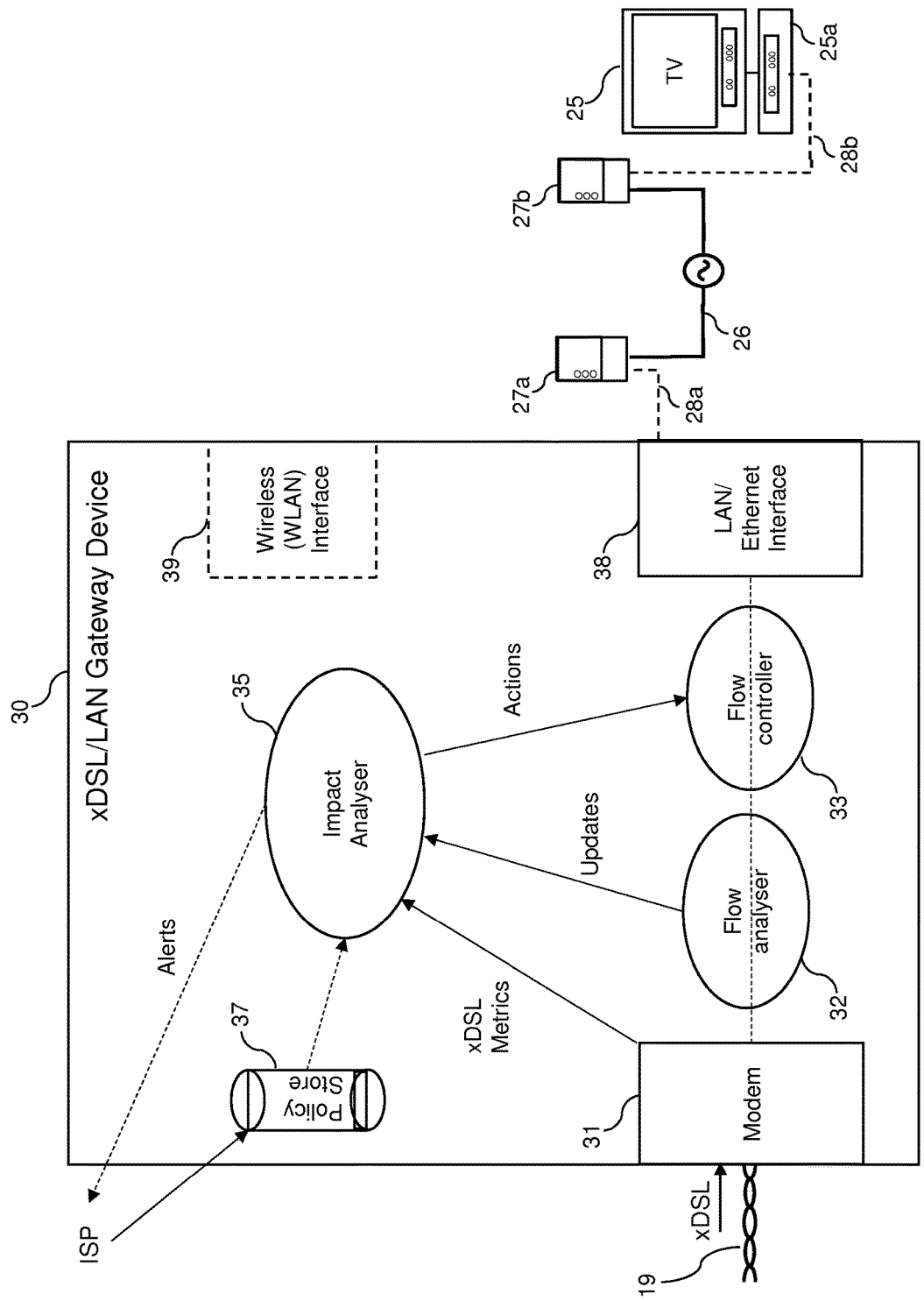
Figure 3: Architecture of Local Area Network Gateway Device

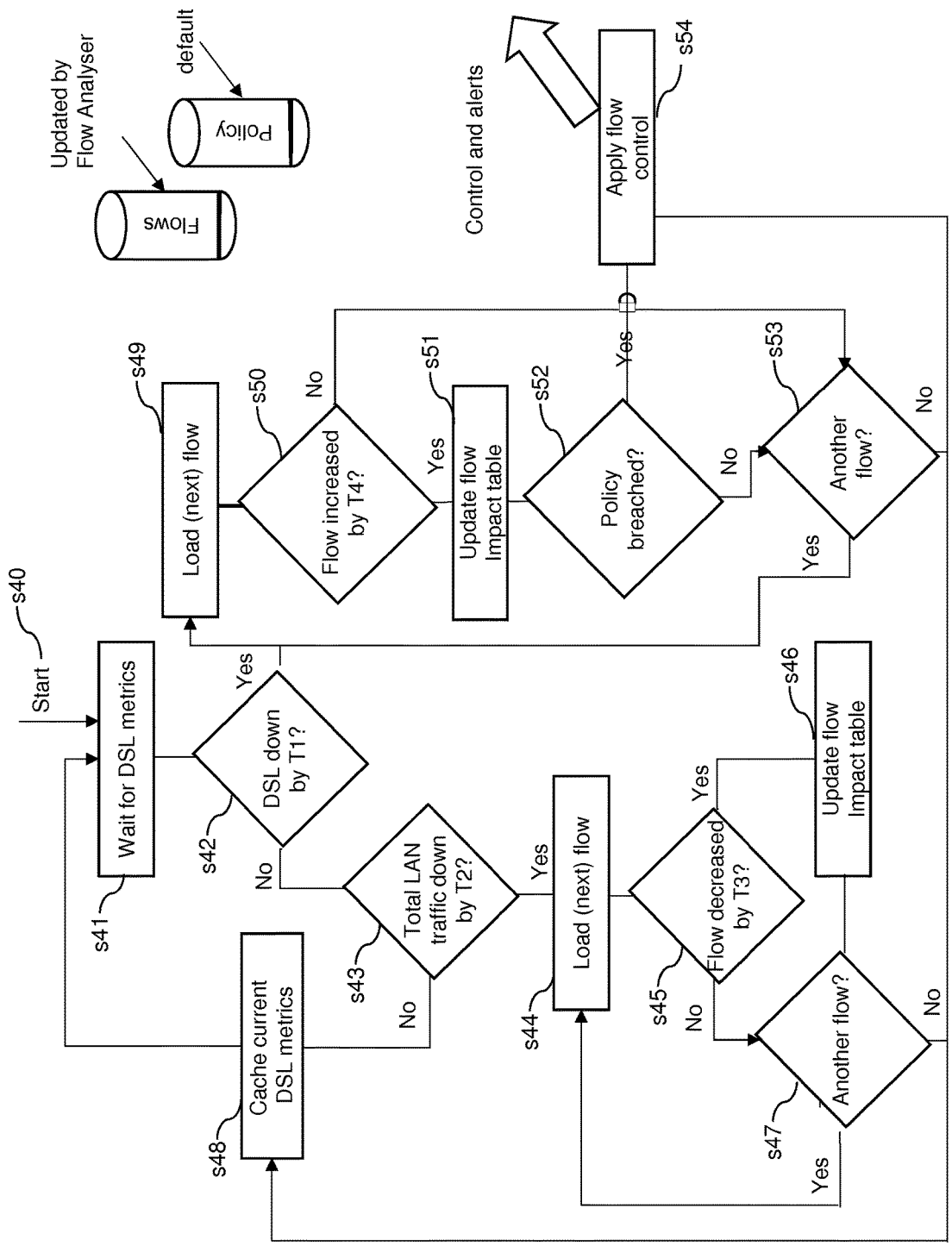
Figure 4: Impact Analyser (IA) Flowchart

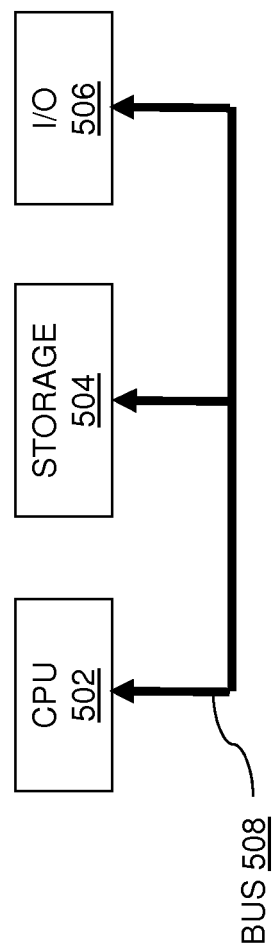
Figure 5: Computer System Modules

CONTROLLING COMMUNICATIONS IN RESPECT OF LOCAL AREA NETWORKS

This application is the U.S. national phase of International Application No. PCT/EP2018/075947 filed Sep. 25, 2018 which designated the U.S. and claims priority to EP17193783.2 filed Sep. 28, 2017, the entire contents of each of which are hereby incorporated by reference.

TECHNICAL FIELD

The present invention relates to methods, apparatus and devices for controlling communications in respect of local area networks. Preferred embodiments relate in particular to methods, apparatus and devices for controlling communications in respect of local area networks in which communications are carried using electrical power-supply or "mains" wiring within the local area network premises for at least a portion of a path between a local area network gateway device and one or more user-devices within the local area network, using adapter devices generally referred to as "powerline units".

BACKGROUND

Powerline units are devices which operate according to the "HomePlug" or ITU G.9960, G.9961 (G.hn) standards. They utilise electrical power-supply or "mains" wiring within customer premises to pass data between fixed endpoints in the premises, in scenarios where wireless or Wi-Fi performance is insufficient or unreliable, for example. They generally operate in pairs (but may operate in larger groups), with one unit generally being connected (generally via a short Ethernet cable) to an xDSL/LAN gateway device of the premises and plugged into the mains via a mains socket near the gateway device, and with one or more other units being plugged into a mains socket elsewhere in the premises (as required) and being connected to other devices (printers, smart (i.e. Internet-enabled) televisions, set-top boxes etc.), generally via another short Ethernet cable. Once connected (and once any required "pairing-up" procedure has been performed between the powerline units), the powerline units communicate with each other via the mains wiring to provide seamless communication to their respective end-devices via Ethernet. Current powerline units are capable of Gigabit speeds.

In the above, the collective term xDSL generally refers to any of a variety of types of Digital Subscriber Line (DSL) technologies including ADSL ("Asymmetric" DSL), SDSL ("Symmetric" DSL), ADSL2+ (a technique that extends the capability of basic ADSL by doubling the number of downstream channels), VDSL (Very-high-bit-rate DSL), VDSL2 (an improved version of VDSL), and others, such as "G.fast". DSL technologies use modulation schemes to modulate data onto copper wires, and are sometimes referred to as "last-mile" technologies because they are generally used for connections from a telephone switching station such as a local exchange (from which telephony is generally also handled), a street cabinet, or a distribution point to customer premises such as homes or offices, rather than between switching stations.

The term LAN refers to a Local Area Network such as that providing wired and/or wireless connectivity to user-devices within a home, an office, or other such premises, generally via a local area network gateway device which may function as a router and/or modem, and may also provide other functionality in respect of the local area network. There are a variety of ways in which devices within a home or office may be linked to a local area network gateway device, including wirelessly (i.e. using "Wi-Fi"), via a dedicated wired or Ethernet connection, or using paired powerline units which are able to use mains wiring—generally already present in a premises for carrying electricity around the premises—to pass data between fixed devices.

While powerline units are able to provide LAN connectivity, xDSL or broadband delivery to premises (i.e. between an xDSL/LAN gateway device and an Internet Service Provider or ISP) can be susceptible to degradation due to electromagnetic interference and noise. Noise and interference are naturally present in the environment, and xDSL systems are designed to adapt when these are present. Signals from powerline units within a LAN can leak (i.e. be radiated or inducted) into the premises phone-line wiring by which xDSL access is provided to xDSL/LAN gateway devices, and as powerline units share much of the frequency range with a large range of xDSL technologies and systems, such signal leakage itself has the potential to reduce or otherwise affect xDSL performance (i.e. performance in respect of data communication outside the local area network to/from the gateway device, which can be measured with reference to speed, reliability, variability, error-rate and other types of data communication characteristics). Effects on xDSL performance in respect of the connection to a local area network gateway device may well, as a result, affect the performance of user-devices on any links (i.e. internal wired or wireless links, as well as those via powerline units) within the local area network in question.

This issue has recently been addressed by the powerline industry by the 2016 ITU standard G.9977, available from https://www.itu.int/rec/T-REC-G.9977-201602-l/en. This requires a dialog to take place between powerline units and an xDSL modem under the control of a management entity to determine if there is an impact on xDSL performance from the powerline units, and if so, which spectrum segments (i.e. frequencies or frequency ranges) are involved. The powerline units can then be directed to reduce their transmission power at certain frequencies according to a "policy", based on the outcome of the dialog.

The actual policy to be applied to alleviate possible problems is not defined or specified by the G.9977 standard, which is not ideal for various reasons including the following:

a) The G.9977 standard does not offer a solution that is suitable for managing the increasingly large amount of devices being used. This is partly because the G.9977 standard does not cater for many older devices, many of which are in use but are not capable of G.9977 compliance.

b) Adjustments made simply in accordance with the G.9977 standard have the potential to be service-affecting in particular during a "learning phase", during which a DSL modem may have to cease active connectivity and measure noise on the line in question.

c) The "learning phase" required in order to comply with the G.9977 standard has the potential to be involved and lengthy, based on the number of powerline devices involved and range of spectrum that needs to be examined.

d) Within the principles set out in the G.9977 standard, there are differences in actual implementation, leading to potential fragmentation and incompatibilities.

Referring to prior patent documents, European Patent Application EP2775696 ("BT") relates to a technique for training a DSL link while transmitting data over a powerline connection. If the powerline connection causes interference on the DSL link then this will be present during the line training, giving a more robust set of line parameters.

An ITU-T Draft document entitled "G.hn, G.vdsl, G.fast: Powerline Interference Indication and Mitigation for DSL Transceivers" (Study Period 2013-2016, Study Group 15—Contribution 0175, Ravi Mantri, Metanoia Technologies, AT&T Inc., July 2013) discusses how powerline networking devices based on G.hn operate by transmitting broadband signals over in-house powerline wiring, which may not be designed for data communications, and may cause excessive electromagnetic (EM) emissions from the wiring when the devices are operating. It explains that the emissions can cause interference in other mediums in the vicinity and affect the performance of the devices operating over those mediums. Home-gateway technologies such as VDSL2 and G.FAST rely on broadband communication that shares the same spectrum as the in-house powerline communication network, and are susceptible to a high degree of EM coupling between the networks, resulting in inter-network interference which may lead to instability and errors. The contribution outlines mechanisms that the gateway device and the powerline communication network can follow to mitigate adverse effects from such inter-network interference, and provides implementation details for G.hn and VDSL2, noting that the techniques are also applicable to mitigate interference suffered by G.FAST and other xDSL access technologies.

It is desirable to be able to protect or regulate xDSL lines' performance if/when this is affected by powerline units operating with a local area network, as this can improve customer experience, but existing solutions generally rely on powerline units being G.9977-compliant and/or rely upon some other proprietary solution, which may rely on an ISP or xDSL/LAN gateway device instructing or interacting with the powerline units themselves. This may itself be particularly problematic as powerline units are generally located physically and topologically within customers' premises and/or other local area networks.

SUMMARY OF THE INVENTION

According to a first aspect of the invention, there is provided a method of controlling communications in respect of a local area network, the local area network having at least one user-device located therein operable to communicate via a local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the method comprising:
  monitoring one or more digital subscriber line performance characteristics in respect of data communications on the digital subscriber line whereby to identify changes in said one or more digital subscriber line performance characteristics;
  monitoring data flow rate in respect of one or more data flows on one or more local area network links between said at least one user-device and said local area network gateway device whereby to identify changes in said data flow rate; and
  adjusting the data flow rate in respect of said one or more data flows on said one or more local area network links in the event that an identified change in said one or more digital subscriber line performance characteristics coincides with an identified change in said data flow rate;
  wherein the step of adjusting the data flow rate in respect of said one or more data flows on said one or more local area network links comprises adjusting the data flow rate on one or more local area network links in respect of which an identified change in the data flow rate has been observed to have coincided with an identified change in said one or more digital subscriber line performance characteristics in respect of data communications on the digital subscriber line.

According to preferred embodiments, the method may comprise a step of comparing times of identified changes in said one or more digital subscriber line performance characteristics with times of identified changes in said data flow rate in order to determine whether an identified change in said one or more digital subscriber line performance characteristics coincides with an identified change in said data flow rate.

According to preferred embodiments, the one or more local area network links via which the one or more user-devices located in the local area network are operable to communicate with the local area network gateway device may include at least one local area network link at least a part of which comprises electrical power-supply wiring such as the mains wiring of the premises in question. The one or more local area network links may include at least one local area network link having at least one adapter device, and generally a pair of adapter devices such as powerline devices, arranged to superpose a signal carrying data of the one or more data flows onto electrical power-supply wiring such as the mains wiring of the premises in question. It will be appreciated however that the entity performing the method may perform the steps in question irrespective of knowledge of whether or not any of the local area network links in question comprise electrical power-supply wiring or are links via powerline devices or other such adapter devices. (In the absence of such powerline transmission or such adapter devices, identified changes in digital subscriber line performance characteristics on the digital subscriber line are unlikely to coincide with identified changes in the data flow rate in respect of data flows on the local area network links, however.)

According to preferred embodiments, the step of monitoring one or more digital subscriber line performance characteristics in respect of data communications on the digital subscriber line may comprises monitoring one or more digital subscriber line performance characteristics selected from speed characteristics, reliability characteristics, variability characteristics, stability characteristics and error-rate characteristics. Some specific examples of possible digital subscriber line characteristics which could be monitored include the currently-available access rate, the maximum-attainable rate, the signal-to-noise ratio, the error-correction rate, the current aggregate line-rate, the number or rate of errored seconds, or the number or rate of "cyclic redundancy check" (CRC) errors (which are an indication that there might be excessive noise on the line). Other characteristics may also be chosen.

According to preferred embodiments, the step of adjusting the data flow rate in respect of the one or more data flows on the one or more local area network links may be performed under the control of the local area network gateway device in question or a local control module associated therewith, in or near the local area network in question, but such adjustments may be performed under the control of a remote control module to which information indicative of identified changes in digital subscriber line performance characteristics on the digital subscriber line and information indicative of identified changes in the data flow rate in respect of data flows on the local area network links have been provided. Such a remote control module may be located in an access network of an Internet Service Provider, for example.

According to preferred embodiments, the step of adjusting the data flow rate in respect of the one or more data flows on the one or more local area network links may comprise reducing the data flow rate on one or more local area network links in respect of which an identified change in the data flow rate has been observed to have coincided with an identified change in the one or more digital subscriber line performance characteristics in respect of data communications on the digital subscriber line. In particular, the step of adjusting the data flow rate in respect of the one or more data flows on the one or more local area network links may comprise reducing the data flow rate on one or more local area network links in respect of which an identified increase in the data flow rate has been observed to have coincided with an identified change in the one or more digital subscriber line performance characteristics indicative of a deterioration in performance in respect of data communications on the digital subscriber line. Correspondingly, the step of adjusting the data flow rate in respect of the one or more data flows on the one or more local area network links may comprise decreasing the data flow rate on one or more local area network links in respect of which an identified decrease in the data flow rate has been observed to have coincided with an identified change in the one or more digital subscriber line performance characteristics indicative of an improvement in performance in respect of data communications on the digital subscriber line, for example.

The adjusting of the data flow rate may involve simply throttling the data flow rate on the link or links in question, or (temporarily) buffering data then transmitting (or re-transmitting) the data on the local area network link(s) in question later, thereby effectively smoothing out peaks in the data rate on the link(s) in question, or may involve implementing a "random discard" or other such "dropping" or re-directing process or algorithm either within or separate to the data transport protocol being used for data transport on the link(s) in question, possibly to encourage a stream to adopt a lower rate. The manner in which the adjusting of the data flow rate is performed on the link(s) in question may therefore depend on the Transport Layer protocol being used for the data transport for the flow in question on the link(s) in question between the local area network gateway device and the user-device(s) in question. The Transport Layer protocol may be the Transmission Control Protocol (TCP), the User Datagram Protocol (UDP) or another protocol.

The adjusting of the data flow rate on the link or links in question (whether it involves throttling the data rate, temporarily buffering data, dropping data units or another type of adjusting) may be performed by or at the local area network gateway device, or possibly by or at the user-device(s) in question, possibly by a module associated with the local area network gateway device and/or the user-device(s) in question.

According to preferred embodiments, one or more of the steps of monitoring one or more digital subscriber line performance characteristics in respect of data communications on the digital subscriber line, monitoring data flow rate in respect of one or more data flows on one or more local area network links, and adjusting the data flow rate in respect of said one or more data flows on said one or more local area network links is performed by or under the control of the local area network gateway device. Alternatively, one or more of the steps may be performed by or under the control of a local control module associated therewith, or by or under the control of a remote control module.

According to a second aspect of the invention, there is provided apparatus for controlling communications in respect of a local area network, the local area network having at least one user-device located therein operable to communicate via a local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the apparatus comprising one or more processors configured to:

monitor one or more digital subscriber line performance characteristics in respect of data communications on the digital subscriber line whereby to identify changes in said one or more digital subscriber line performance characteristics;

monitor data flow rate in respect of one or more data flows on one or more local area network links between said at least one user-device and said local area network gateway device whereby to identify changes in said data flow rate; and to adjust the data flow rate in respect of said one or more data flows on said one or more local area network links in the event that an identified change in said one or more digital subscriber line performance characteristics coincides with an identified change in said data flow rate, the one or more processors being configured to adjust the data flow rate on one or more local area network links in respect of which an identified change in the data flow rate has been observed to have coincided with an identified change in said one or more digital subscriber line performance characteristics in respect of data communications on the digital subscriber line.

According to a third aspect of the invention, there is provided local area network gateway device comprising apparatus according to the second aspect.

According to a fourth aspect of the invention, there is provided a local area network gateway device configured to perform a method according to the first aspect.

According to a fifth aspect of the invention, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the second, third, fourth and fifth aspects.

It will be noted that the functionality for performing methods according to preferred embodiments could be implemented by means of software updates to existing xDSL/LAN gateway devices or could be included as part of the firmware build of new devices.

BRIEF DESCRIPTION OF THE DRAWINGS

A preferred embodiment of the present invention will now be described with reference to the appended drawings, in which:

FIG. 1 illustrates various ways in which user-devices within a local area network may be in communication with a local area network gateway device, and via that with external networks and with devices in external networks;

FIG. 2 indicates how VDSL degradation may be related to powerline traffic rate;

FIG. 3 illustrates functional modules which may be present in a Local Area Network Gateway Device configured to perform a method according to a preferred embodiment;

FIG. 4 illustrates a method that may be performed when controlling communications in respect of a local area network according to a preferred embodiment; and FIG. 5 is a block diagram of a computer system suitable for use in performing methods according to preferred embodiments of the invention.

DESCRIPTION OF PREFERRED EMBODIMENTS OF THE INVENTION

With reference to the accompanying figures, a method according to a preferred embodiment and associated systems and apparatus will be described. Firstly however, a scenario in which user-devices within a local area network may be in communication with a local area network gateway device in various ways, including via powerline units, will be described.

FIG. 1 shows a Local Area Network or LAN 20 within which various user-devices, which may be temporarily or permanently based in a local area or building such as a home, office or other premises, may be or are being used to communicate with servers and/or other devices in networks outside the LAN (and therefore generally outside the local area or premises) via external networks such as an access network 15 of an Internet Services Provider (ISP), a core network, the Internet 10 or other networks, and/or with other platforms, networks etc. While the Internet 10 and an ISP network 15 are shown, this figure is primarily intended to illustrate various ways in which user-devices within the local area network 20 may be in communication with a local area network gateway device 30, and thus with external networks and with devices in or connected to such external networks via the xDSL/LAN gateway device 30.

The LAN 20 itself is represented in FIG. 1 by a "dot-dash" rectangle. It will be appreciated that the LAN 20 would not generally have a strictly-defined physical boundary, let alone be rectangular in shape—its physical extent would be dependent on where user-devices would be able to be located while still being able to communicate via a wired or wireless connection with the xDSL/LAN gateway device 30.

To avoid unnecessary clutter, the premises itself and its physical boundaries (walls, etc.) are not shown separately, but for the purposes of this example, the "dot-dash" line indicating the extent of the LAN may be thought of as corresponding approximately to the extent of the premises.

The xDSL/LAN gateway device 30, which will be discussed in more detail later with reference to FIG. 3, is a device having various functional modules including a modem 31, which serves as or is linked to an external or Wide Area Network (WAN) interface, and one or more local area network interfaces, in this case an internal Ethernet interface 38 for wired/Ethernet connections to user-devices within the premises via dedicated wired or Ethernet connections or otherwise, and an internal wireless (or "Wi-Fi") interface 39 having an antenna 39a for communicating wirelessly with user-devices. The xDSL/LAN gateway device 30 would generally also include a memory and a processor for performing processing related to routing and other functions. These are not shown to avoid unnecessary clutter, but the routing of data between the modem 31 and the internal interfaces 38, 39 is represented by dotted lines within the xDSL/LAN gateway device 30.

The xDSL/LAN gateway device 30 is in communication with the ISP network 15 (and hence with other external networks such as the Internet 10 and other networks) via an xDSL link 19, which in this case is shown as a VDSL link over a twisted copper-pair subscriber-line to a street-cabinet or distribution point (DP). (NB The acronym "DP" is sometimes also used to refer to a 'drop point', and the distribution point may in fact be a drop point, but in general, where the acronym "DP" is used here, it will be used to refer to the term "distribution point", whether this is a drop point or otherwise). In general, the xDSL connection comprises a copper subscriber line extending between two xDSL modems, one being the modem 31 in the xDSL/LAN gateway device 30, and the other being located in the street cabinet or DP, or (in the case of ADSL) at the local exchange (known as the 'central office' in US terminology). Typically, the local exchange, street cabinet or distribution point includes a DSL Access Multiplexer or "DSLAM" (a form of aggregation transceiver device, not shown) comprising several DSL modems (one for each subscriber line) or equivalent device, depending on the type or types of xDSL involved. The DSLAM (at the exchange, cabinet or distribution point) connects the first DSL modem at the customer's premises to the ISP, access or core network, typically over a faster optical fibre connection.

By virtue of the internal interfaces, there are a variety of ways in which devices within the premises may be linked to the xDSL/LAN gateway device, including wirelessly (i.e. using "Wi-Fi"), via a dedicated wired or Ethernet connection, or using paired powerline units which are able to use mains wiring—generally already present in a premises for carrying electricity around the premises—to pass data between fixed devices.

In FIG. 1, four different types of user-device are shown in the premises covered by the LAN 20, namely a handheld or "tablet-style" wireless-enabled computing device or mobile smart-phone 22, a wireless-enabled laptop computer 23, a desktop computer 24 and an Internet-enabled television 25. The desktop computer 24 and television 25 may be wireless-capable, but for the purpose of the present example will be regarded as having Ethernet connectivity in order to illustrate relevant concepts as clearly as possible.

The mobile or tablet device 22 and the laptop device 23 are shown as being connected wirelessly to the xDSL/LAN gateway device 30 via the wireless interface 39.

The desktop computer 24 is shown as being connected to the xDSL/LAN gateway device 30 via a wired/Ethernet connection 28d to the Ethernet interface 38 of the xDSL/LAN gateway device 30.

Also represented in FIG. 1 is the electrical supply or mains wiring 26 for the premises. While each electrical device would generally need to be connected to the mains wiring 26 at least temporarily (to re-charge) or while being used, electrical connections are only shown to some of the devices, in particular an electrical connection 26d to the desktop computer 24, an electrical connection 26c to the television 25, and electrical connections 26a and 26b respectively to each of a pair of powerline units 27a and 27b, one of which (powerline unit 27a) is located close to the xDSL/LAN gateway device 30 and the other of which (powerline unit 27b) is located close to the television 25.

For its network or data connectivity (as opposed to its electrical power supply connection), the television 25 is shown as being connected via a wired/Ethernet connection 28b to the powerline unit 27b, which is connected via the mains wiring 26 to the powerline unit 27a with which it forms a pair, and with which it is therefore able to exchange data via the mains wiring 26. Powerline unit 27a is shown as being connected via a wired/Ethernet connection 28a to Ethernet interface 38 of the xDSL/LAN gateway device 30.

As a result of the connection via the pair of powerline units 27a, 27b, television 25 is in communication with xDSL/LAN gateway device 30 via the mains wiring 26 of the premises. It will be noted however that the direct connections to the television 25 and the xDSL/LAN gateway device 30 are normal Ethernet connections, and neither the television 25 nor the xDSL/LAN gateway device 30 need to function in a different manner on account of the fact that the communication between them happens (in part) over the mains wiring 26 of the premises—both may simply function as if the communication between them is happening simply via a normal Ethernet connection. Essentially, neither the television 25 nor the xDSL/LAN gateway device 30 even needs to be "aware" that the communication between them is happening (in part) over the mains wiring 26.

As previously mentioned powerline devices and xDSL systems share similar frequency spectrum and the previous and current approach to mitigate the effect of powerline interference has been to reduce the transmit power if it is determined from a dialog between the powerline units and an xDSL modem that the powerline units are having an impact on the xDSL performance to the xDSL modem (i.e. the external performance on the xDSL link between the xDSL modem and the local exchange, the street cabinet or the distribution point). However, powerline signalling is essentially based on time division multiplex signalling, where the amount of time it takes to transmit is dependent on the traffic load over a given link in the LAN and/or the premises (i.e. a network connection between the xDSL/LAN gateway device, which may be in the hall of a house, for example, and a user-device such as a television elsewhere in the house, the connection being made using a pair of powerline devices). Although the power emitted and the frequency range used by the powerline devices is generally fixed, the effective period that they transmit is generally variable.

The inventors have established that the relationship between traffic load and damage to xDSL (for any given level of interference) is related to traffic levels (i.e. the LAN data rate between the powerline devices, or "throughput"). This is illustrated by the graph in FIG. 2, which shows (specifically in the specific case of a VDSL2 link over a 1600 m line with powerline interference occurring over the last 15 m) that VDSL degradation is related to powerline traffic rate. The spike(s) in the graph at around 65-70 Mbps suggest that the VDSL link needed to retrain due to the powerline traffic.

In view of this, the inventors have established that this relationship between LAN traffic rate (i.e. internally) and damage to broadband performance to the LAN from outside (which itself will have a resulting effect on the internal LAN performance as well, of course) allows the xDSL/LAN gateway device itself to be able to detect and monitor whether xDSL performance is being affected by interference from powerline devices within the LAN, and therefore allows the xDSL/LAN gateway device itself to control internal LAN communications in order to mitigate the effects of such interference. In other words, the impact on xDSL performance of powerline signal leakage is related to the level (i.e. data flow rate) of traffic through those powerline units, as well as to their transmission power.

Based on this, preferred embodiments involve determining if observed changes in communication characteristics (i.e. error rates increases, line-rate reductions or changes in other performance metrics) on an xDSL line appear to coincide with observed changes (i.e. generally, increases, but possibly decreases) in the data flow rate on one or more LAN links within the premises. If so, while the xDSL/LAN gateway device may essentially be "unaware" that communications on those internal LAN links are happening via powerline units and the mains wiring, it is unlikely that such coincident changes would occur otherwise, as other communications within a LAN would not generally take place using transmission frequencies that would cause interference at such coincident times, so it can be inferred by the xDSL/LAN gateway device (without the need for any dialog with the powerline units) that the xDSL changes are (almost certainly) being caused by coincident powerline signal leakage. The xDSL/LAN gateway device can thus react by applying traffic flow control on the LAN link(s) in question if/when appropriate in order to protect the xDSL performance to the premises. Such traffic flow control may involve reducing the data flow rate on the LAN link(s) concerned, for example, rather than simply reducing the power used for transmissions used on those links as would happen according to the G.9977 standard.

Since xDSL/LAN gateway devices are generally provided to customers by their ISPs, this allows ISPs to provide suitably configured or modified xDSL/LAN gateway devices to their customers which will be able to minimise or regulate the impact on xDSL performance of any powerline units that the customers are using in their LANs, which those ISPs may well not own or control and/or with which those ISPs may be unable to communicate. Further, any such regulation of the impact on xDSL performance of any powerline units in a LAN may be based on a desired or specified xDSL/LAN performance balance, rather than on a (possibly arbitrary) spectral power level specified in the G.9977 standard, for example).

Such preferred embodiments allow policies to be applied in order to regulate the behaviour of the xDSL/LAN gateway devices in question, and hence the effect on them of any powerline devices within the LANs in respect of which they are acting. Such policies may be pre-set or configured by ISPs on behalf of their customers, or may be configured by the customers themselves, possibly based on a default setting.

There now follows a detailed methodology by which such monitoring and adjustment may be performed. Such a method may be performed by an xDSL/LAN gateway device in a scenario such as that shown in FIG. 1, but the more detailed processing according to a preferred embodiment will refer to the more detailed diagram of a suitably configured or modified xDSL/LAN gateway device shown in FIG. 3.

FIG. 3 shows the architecture of an xDSL/LAN gateway device for a LAN such as a home LAN, which is similar to that shown in FIG. 1 but also shown additional functional modules enabling it to perform a method according to a preferred embodiment and thereby protect the xDSL connection.

As before, the xDSL/LAN gateway device 30 is shown as having a modem 31 from which it is linked via an xDSL link 19 to an ISP network (not shown in FIG. 3), and as before, is shown as having a LAN/Ethernet interface 38 for wired/Ethernet connections to user-devices within the premises, and a wireless interface 39 for communicating wirelessly with user-devices (although the wireless interface is not of particular relevance for the purpose of the present explanation, so will not be discussed further). Also as before, a television 25 is shown, again communicating with the Ethernet interface 38 of xDSL/LAN gateway device 30 via a pair of powerline devices 27a and 27b over the mains wiring 26, the powerline devices 27a and 27b having respective Ethernet connections 28a and 28b. In FIG. 3, the television 25 is shown as having a separate set-top box (STB) 25a into which Ethernet connection 28b is plugged, but this is arbitrary—some televisions may have the functionality provided an STB themselves.

Additional functional modules are shown, namely a flow analyser 32, a flow controller 33, an impact analyser 35 and a policy store 37.

For the sake of simplicity, an example will be considered in which a single default policy (stored in the policy store 37, for example) is present, specifying for example that a given xDSL rate (one that the customer is paying for, for example) should be met, but it will be appreciated that in other examples, more than one policy may be available, or the policy may be changed by the customer or by the ISP (as symbolised by the arrow from the ISP). Even such a simple policy may have a big impact, however. In the case of a VDSL home (for example) where the customer is paying for a 30 Mbps service but the VDSL connection is generally achieving 50 Mbps, then an impact of up to 20 Mbps could be accommodated without issue. If however a customer paying for the same 30 Mbps service is actually receiving 33 Mbps to the home, then very little degradation due to powerline ingress can be accepted, and a low traffic rate in the home (over the powerline links, and over other links within the LAN, such as Wi-Fi) may result.

The policy may change if it becomes clear that communication within the LAN is significantly or severely affecting access speed to the LAN. In this case a policy may be used which expresses or reflects a balance of access and LAN connectivity agreed with the customer in question. For homes on short loop lengths there will probably not be any significant effect from powerline devices in the home. In the case of long lines, the link to the access network may become unstable above a certain speed, so regulating it to a cap a safe level below that (20% below, for example) would generally provide a good balance between xDSL and LAN performance. In such a case, this would be the set policy. There may also be multiple polices ensuring a prioritised action, such as might occur if there were multiple powerline links in a home. For present purposes, we will consider a simple single-endpoint policy.

Referring again to FIG. 3, the xDSL modem 30 provides updates (shown as "xDSL metrics") on the performance of the xDSL line 19. The type of updates may depend on the type of xDSL technology being employed. For VDSL, they may be (or include) one or more of the currently-available access rate, the maximum-attainable rate, signal-to-noise (SNR) data, error correction data, etc., for example. Other metrics such as the current aggregate line-rate may be used instead or as well.

The flow analyser 32 captures information on all the distinct flows (separate IP connections, for example) through the gateway device 30. These may be expressed as source/destination IP addresses. It may provide updates on a regular basis, every second, for example. The flow analyser 32 may also aggregate flows for a given home endpoint address, which represents an end user-device, for example. For instance, if the set-top box (STB) 25a in FIG. 3 (connected via the pair of powerline devices 27a and 27b) was recording as well as processing a live stream there would generally be two distinct flows, but the flow analyser 32 may aggregate these and report them as if they were one.

The flow controller 33 may take a tuple of home destination IP address and the rate required. In this example, one device and one flow are considered, but a more complex scheme might split device flows, if the policy has sufficient granularity. The flow controller 33 may apply control in various different ways, as will become apparent. It may buffer data to re-transmit after a peak, or may employ a "random discard" process or algorithm to encourage a stream to adopt a lower rate, or may otherwise throttle the data flow rate on the LAN link in question. Where the data transport for the flow (i.e. at the Transport Layer, if characterising this in terms of the Open Systems Interconnection (OSI) reference model) on the LAN link in question is being performed according to Transmission Control Protocol (TCP), with the gateway device 30 and the user-device in question acting as TCP endpoints for the flow on the LAN link in question, the gateway device 30 may employ additional TCP flow control by delaying/dropping packets, for example, possibly using the feature of TCP whereby the detection of packet loss causes the data rate between the respective TCP end-points to be throttled back temporarily, before being allowed to increase back towards the previous level. If however the LAN link in question is carrying television (TV) content or other such audio, video or multimedia content between the gateway device 30 and a user-device such as an Internet-enabled television 25, for example, the data transport for the flow on the LAN link in question may be performed according to a different protocol such as the User Datagram Protocol (UDP), in relation to which any such throttling may need to be implemented directly by the gateway device and/or the user-device in question separate from or irrespective of the data transport protocol in question.

The Impact Analyser (IA) 35 is in communication with the modem 31 (from which it receives updates on the xDSL metrics) as well as with the flow analyser 32 (from which it receives updates on the LAN flows), with the flow controller 33 (to which it may provide instructions as to whether and how to control the LAN flows) and with the policy store 37. In this example, the Impact Analyser 35 takes the given policy and assesses if any flow (or combination of flows) is impacting the xDSL signal above a policy limit, doing so by observing whether there is a correlation between the times of observed changes in communication characteristics on the xDSL line and the times of observed changes in the data flow rate on one or more of the LAN links within the premises. If there are, the Impact Analyser 35 issues a flow control action. It may also issue an alert to the ISP (symbolised by the dotted arrow). It will be noted that a default policy might be to detect (or infer) the presence of powerline ingress and raise this as a log/alert for a helpdesk agent if a customer reports a fault, allowing instructions relating to any flow control then deemed to be appropriate in respect of any LAN flows to be provided from the ISP or elsewhere. In this case the additional modules within the xDSL/LAN gateway device may perhaps be reduced to a flow analyser 32 and an Impact Analyser 35.

Returning to the example of FIG. 3, the Impact Analyser 35 may monitor the effectiveness of the flow control action. Depending on the policy, it may issue further flow control actions and/or alerts if the policy still cannot be met (i.e. a new policy may then be discussed with the customer and applied). This facility is beneficial as the conditions within the customer's home may change and capturing this situation may be an important additional improvement.

The detailed operation of the Impact Analyser 35 according to a preferred embodiment is depicted in FIG. 4, which illustrates how the analysis process may be performed. It will be appreciated that other approaches may be used to perform the analysis and provide the resulting flow control.

From a start point indicated by s40, the process may run continuously or may be triggered when an xDSL update is received. A number of thresholds may be used to provide a suitable level of sensitivity to its operation. These will be discussed in more detail below, after an explanation of the overall process.

At step s41, the Impact Analyser 35 waits for xDSL metric updates. Receipt of these triggers the process to move to step s42.

At step s42, it is established whether the received metrics indicate a significant change (based on a first threshold, T1). If so, this indicates that some action should be taken. For a significant degradation in xDSL performance, the process proceeds via steps s49, s50, s51, s52, s53 and s54 before returning to step s41 via step s48. For a significant improvement in xDSL performance, the process proceeds via steps s43, s44, s45, s46 and s47 before returning to step s41 via step s48. It should be noted that the check made at step s42 may also consider longer-term drift as well as significant step-changes in xDSL performance.

Looking first at the process and path if it is found at step s42 that there has been a significant degradation in xDSL performance, individual LAN flows may be considered in turn.

At step s49, the updates for the first (and subsequently, each other known) LAN flow under consideration are loaded (although flows that have previously been marked as known not to have an impact on xDSL performance may be skipped). For each known flow under consideration, it is ascertained at step s50 whether or not the flow's rate (or another such flow metric) has increased by a significant amount (based on a threshold T4). If the flow has not increased by a significant amount, and if it is found at step s53 that there is another flow to be considered, the process returns to step s49 and updates for the next flow are loaded. If there are no more flows to be considered, the current xDSL metrics are cached (step s48), and the process returns to step s41.

If it is ascertained at step s50 that the flow's rate (or other such flow metric) has increased by a significant amount (based on the threshold T4), the process continues to step s51.

At step s51, a table that holds records of flows with a significant impact is updated. This step may involve entering a new flow into the table or updating the record in respect of an existing flow. An existing flow may have an averaging process applied or longer term statistics may be used to determine its impact. The dependency may be expressed in Mbps per change in xDSL performance/Mbps per change in LAN flow rate, and may be accumulated for each flow from/to a device in the premises.

It is then established at step s52 if the currently-implemented policy has been breached (which may happen at any point in such an iterative process). If the policy has not been breached, the process proceeds via steps s53 and s49 and other flows are considered until all have been, at which point, the current xDSL metrics are cached (step s48), and the process returns to step s41.

If it is established at step s52 that the policy has been breached, the process proceeds to step s54 and the flow controller 33 (shown in FIG. 3) is instructed to apply control. The instructions specify the local end-point (i.e. the destination IP address of the LAN link in question) and the level of restriction to apply.

Referring in more details to step s54, reached if it is established at step s52 that the policy has been breached and that action should be taken to apply flow in respect of the LAN link in question (which can be assumed to be a LAN link involving powerline devices which is causing interference affecting the xDSL performance), there are a number of decisions (not shown in the flow-chart) which may be taken. Firstly, if this is the first time it has been deemed appropriate to take action in respect of a particular flow, flow control may be applied in a default manner. If it is found that this is a repeat report or instruction in respect of the same flow, it may be that there has been a delay in implementing previously-instructed flow control, so further action may be skipped. If however this is a repeat report for the flow and a suitable period of assessment has expired, this may be taken to indicate that the learning process being used is not accurate, and a reset command may be issued in respect of the table holding records of flows recorded as having a significant impact. This does not necessarily indicate an error but may occur naturally as conditions in the premises in question may have changed. If this is found to be the case, the process of checking the flows may be halted and the process may return to step s41 via step s48, at which the current xDSL metrics may be cached.

Looking now at the process and path if it is established from received xDSL updates that there has been a significant improvement in xDSL performance, the process first proceeds to step s43.

At step s43, an assessment is made as to whether the LAN traffic flow rate has dropped by a significant threshold amount T2 (or alternatively has dropped below a threshold T2'). A primary aim of this branch of the process may also be to look for critical flows indicated by a decrease in ingress/interference. If the LAN traffic is down by the threshold amount T2 (or has dropped below a threshold T2'), it can be inferred that at least one flow is causing this.

At step s44, the updates for the first (and subsequently, each other known) LAN flow under consideration are loaded At step s45, a determination is made as to whether the flow's rate (or another such flow metric) has reduced by a threshold amount T3.

If the flow rate has not reduced by the threshold amount T3, and if it is found at step s47 that there is another flow to be considered, the process returns to step s44 and updates for the next flow are loaded. If there are no more flows to be considered, the current xDSL metrics are cached (step s48), and the process returns to step s41.

If it is ascertained at step s45 that the flow's rate (or other such flow metric) has reduced by the threshold amount T3, the process continues to step s46.

At step s46, the flow deemed to be having a significant impact has been identified, so the table holding records of flows with a significant impact is updated. As before, this may involve recording a tuple of the LAN link end-point and flow rate. This check should pick up and confirm the actions of previous flow controls, and may also enter new flows. It may also apply longer-term averaging as used in the counterpart update action of step s51.

If it is then found at step s47 that there are no other flows to be considered, the current xDSL metrics are cached (step s48), and the process returns to step s41.

As explained before, a longer-term view of the metrics may be employed to detect whether a gradual drift is present as well as to detect significant step-changes in xDSL performance.

Turning to the various thresholds discussed above, these may be chosen according to the requirements of the system in question, but the following suggested thresholds may be used:

The threshold T1 for assessing the amount of change in xDSL performance in step s41 may be set at a level to trigger action only on a 5% (or greater) deviation in xDSL metrics, for example, ensuring that only major changes therein will lead to the additional processing starting from step s49. For VDSL this might also include a retrain event, for example. As mentioned earlier, this may also include a percentage drift from the last significant rate event, such as a retrain or G.fast initial rate.

The threshold T2 for assessing the amount the LAN traffic rate has decreased in step s43 may be set at a level to trigger action only on a 5% (or greater) deviation in traffic rate, for example, similarly ensuring that only significant changes will lead to the additional processing starting from step s44 to find a possible correlation with a flow increase. If no correlation is found, it may be inferred that the observed decrease in LAN traffic rate may have been due to a 'natural' noise event, so does not necessarily indicate an error.

Thresholds T3 & T4 are provided to ensure that action is only taken on the basis of a reasonable amount of change in LAN flow rate, which may be of the order of a 1% or a few percent change. These thresholds should generally be much smaller than thresholds T1 and T2 since these represent changes across the entire interface, whereas thresholds T3 and T4 are generally applied only in respect of traffic rates on individual LAN links to individual end-devices.

FIG. 5 is a block diagram of a computer system suitable for use in performing methods according to preferred embodiments. Such a system may be linked to or a part of an xDSL/LAN gateway device such as that shown in FIGS. 1 and 3. In such a computer system, a central processor unit (CPU) 502 is communicatively connected to a data store 504 and an input/output (I/O) interface 506 via a data bus 508. The data store 504 can be any read/write storage device or combination of devices such as a random access memory (RAM) or a non-volatile storage device, and can be used for storing executable and/or non-executable data. Examples of non-volatile storage devices include disk or tape storage devices. The I/O interface 506 is an interface to devices for the input or output of data, or for both input and output of data. Examples of I/O devices connectable to I/O interface 506 include a keyboard, a mouse, a display (such as a monitor) and a network connection.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the invention may include other novel features or combinations of features disclosed herein. The applicant hereby gives notice that new claims may be formulated to such features or combinations of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of controlling communications in respect of a local area network, the local area network having at least one user-device located therein operable to communicate via a local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the method comprising:

monitoring one or more digital subscriber line performance characteristics in respect of data communications on the digital subscriber line whereby to identify changes in said one or more digital subscriber line performance characteristics;

monitoring data flow rate in respect of one or more data flows on one or more local area network links between said at least one user-device and said local area network gateway device whereby to identify changes in said data flow rate; and adjusting the data flow rate in respect of said one or more data flows on said one or more local area network links in the event that an identified change in said one or more digital subscriber line performance characteristics coincides with an identified change in said data flow rate;

wherein the step of adjusting the data flow rate in respect of said one or more data flows on said one or more local area network links comprises adjusting the data flow rate on one or more local area network links in respect of which an identified change in the data flow rate has been observed to have coincided with an identified change in said one or more digital subscriber line performance characteristics in respect of data communications on the digital subscriber line.

2. The method according to claim 1, further comprising a step of comparing times of identified changes in said one or more digital subscriber line performance characteristics with times of identified changes in said data flow rate in order to determine whether an identified change in said one or more digital subscriber line performance characteristics coincides with an identified change in said data flow rate.

3. The method according to claim 1, wherein the monitoring of the data flow rate in respect of the one or more data flows on the one or more local area network links includes monitoring data flow rate in respect of at least one local area network link at least a part of which comprises electrical power-supply wiring.

4. The method according to claim 1, wherein the monitoring of the data flow rate in respect of the one or more data flows on the one or more local area network links includes monitoring data flow rate in respect of at least one local area network link having at least one adapter device arranged to superpose a signal carrying data of said one or more data flows onto electrical power-supply wiring.

5. The method according to claim 1, wherein the step of monitoring one or more digital subscriber line performance characteristics in respect of data communications on the digital subscriber line comprises monitoring one or more digital subscriber line performance characteristics selected from speed characteristics, reliability characteristics, variability characteristics, stability characteristics and error-rate characteristics.

6. The method according to claim 1, wherein the step of adjusting the data flow rate in respect of said one or more data flows on said one or more local area network links comprises reducing the data flow rate on one or more local area network links in respect of which an identified change in the data flow rate has been observed to have coincided with an identified change in said one or more digital subscriber line performance characteristics in respect of data communications on the digital subscriber line.

7. The method according to claim 1, wherein the step of adjusting the data flow rate in respect of said one or more data flows on said one or more local area network links comprises reducing the data flow rate on one or more local area network links in respect of which an identified increase in the data flow rate has been observed to have coincided with an identified change in said one or more digital subscriber line performance characteristics indicative of a deterioration in performance in respect of data communications on the digital subscriber line.

8. The method according to claim 1, wherein the step of adjusting the data flow rate in respect of said one or more data flows on said one or more local area network links comprises one or more of:
   throttling the data flow rate in respect of said one or more data flows on said one or more local area network links;
   temporarily buffering data units of said one or more data flows before transmitting said data units on said one or more local area network links;
   dropping or re-directing data units of said one or more data flows intended to be transmitted on said one or more local area network links.

9. The method according to claim 1, wherein the step of adjusting the data flow rate in respect of said one or more data flows on said one or more local area network links comprises the local area network gateway device or a module associated therewith and/or the at least one user-device or a module associated therewith implementing the adjustment to the data flow rate in respect of said one or more data flows on said one or more local area network links.

10. The method according to claim 1, wherein one or more of the steps of monitoring one or more digital subscriber line performance characteristics in respect of data communications on the digital subscriber line, monitoring data flow rate in respect of one or more data flows on one or more local area network links, and adjusting the data flow rate in respect of said one or more data flows on said one or more local area network links is performed by or under the control of the local area network gateway device.

11. An apparatus for controlling communications in respect of a local area network, the local area network having at least one user-device located therein operable to communicate via a local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the apparatus comprising one or more processors configured to:
   monitor one or more digital subscriber line performance characteristics in respect of data communications on the digital subscriber line whereby to identify changes in said one or more digital subscriber line performance characteristics;
   monitor data flow rate in respect of one or more data flows on one or more local area network links between said at least one user-device and said local area network gateway device whereby to identify changes in said data flow rate; and
   adjust the data flow rate in respect of said one or more data flows on said one or more local area network links in the event that an identified change in said one or more digital subscriber line performance characteristics coincides with an identified change in said data flow rate, the one or more processors being configured to adjust the data flow rate on one or more local area network links in respect of which an identified change in the data flow rate has been observed to have coincided with an identified change in said one or more digital subscriber line performance characteristics in respect of data communications on the digital subscriber line.

12. The apparatus according to claim 11, comprised in a local area network gateway device.

13. The apparatus according to claim 11, wherein the one or more processors is further configured to compare times of identified changes in said one or more digital subscriber line performance characteristics with times of identified changes in said data flow rate in order to determine whether an identified change in said one or more digital subscriber line performance characteristics coincides with an identified change in said data flow rate.

14. The apparatus according to claim 11, wherein the one or more local area network links include at least one local area network link at least a part of which comprises electrical power-supply wiring.

15. The apparatus according to claim 11, wherein the one or more local area network links include at least one local area network link having at least one adapter device arranged to superpose a signal carrying data of said one or more data flows onto electrical power-supply wiring.

16. The apparatus according to claim 11, wherein adjustment of the data flow rate in respect of said one or more data flows on said one or more local area network links comprises reduction of the data flow rate on one or more local area network links in respect of which an identified change in the data flow rate has been observed to have coincided with an identified change in said one or more digital subscriber line performance characteristics in respect of data communications on the digital subscriber line.

17. The apparatus according to claim 11, wherein adjustment of the data flow rate in respect of said one or more data flows on said one or more local area network links comprises reduction of the data flow rate on one or more local area network links in respect of which an identified increase in the data flow rate has been observed to have coincided with an identified change in said one or more digital subscriber line performance characteristics indicative of a deterioration in performance in respect of data communications on the digital subscriber line.

18. The apparatus according to claim 11, wherein adjustment of the data flow rate in respect of said one or more data flows on said one or more local area network links comprises one or more of:
- throttling of the data flow rate in respect of said one or more data flows on said one or more local area network links;
- temporarily buffering of data units of said one or more data flows before transmitting said data units on said one or more local area network links; and
- dropping or re-directing of data units of said one or more data flows intended to be transmitted on said one or more local area network links.

19. The local area network gateway device for controlling communications in respect of a local area network, the local area network having at least one user-device located therein operable to communicate via the local area network gateway device with one or more remote devices in a communications network outside the local area network, communications being carried via one or more local area network links for at least a portion of a path between the at least one user-device and the local area network gateway device, and being carried via a digital subscriber line for at least a portion of a path between the local area network gateway device and the one or more remote devices, the local area network gateway device being at least configured to:
- monitor one or more digital subscriber line performance characteristics in respect of data communications on the digital subscriber line whereby to identify changes in said one or more digital subscriber line performance characteristics;
- monitor data flow rate in respect of one or more data flows on one or more local area network links between said at least one user-device and said local area network gateway device whereby to identify changes in said data flow rate; and
- adjust the data flow rate in respect of said one or more data flows on said one or more local area network links in the event that an identified change in said one or more digital subscriber line performance characteristics coincides with an identified change in said data flow rate;

wherein adjustment of the data flow rate in respect of said one or more data flows on said one or more local area network links comprises adjustment of the data flow rate on one or more local area network links in respect of which an identified change in the data flow rate has been observed to have coincided with an identified change in said one or more digital subscriber line performance characteristics in respect of data communications on the digital subscriber line.

20. A non-transitory computer readable storage medium storing computer program code to, when loaded into a computer system and executed thereon, cause the computer to perform steps for controlling communications in respect of a local area network, the local area network having at least one user-device located therein operable to communicate via a local area network gateway device with one or more remote devices in a communications network outside the local area network communications being carried via one or more local area network links for at least a portion of a path between the at least one user-device and the local area network gateway device, and being carried via a digital subscriber line for at least a portion of a path between the local area network gateway device and the one or more remote devices, the steps comprising:
- monitoring one or more digital subscriber line performance characteristics in respect of data communications on the digital subscriber line whereby to identify changes in said one or more digital subscriber line performance characteristics;
- monitoring data flow rate in respect of one or more data flows on one or more local area network links between said at least one user-device and said local area network gateway device whereby to identify changes in said data flow rate; and
- adjusting the data flow rate in respect of said one or more data flows on said one or more local area network links in the event that an identified change in said one or more digital subscriber line performance characteristics coincides with an identified change in said data flow rate;

wherein the step of adjusting the data flow rate in respect of said one or more data flows on said one or more local area network links comprises adjusting the data flow rate on one or more local area network links in respect of which an identified change in the data flow rate has been observed to have coincided with an identified change in said one or more digital subscriber line performance characteristics in respect of data communications on the digital subscriber line.

* * * * *